H. WHIPPLE.
Drafting Plotters.
No. 14,329.
Patented Feb. 26, 1856.
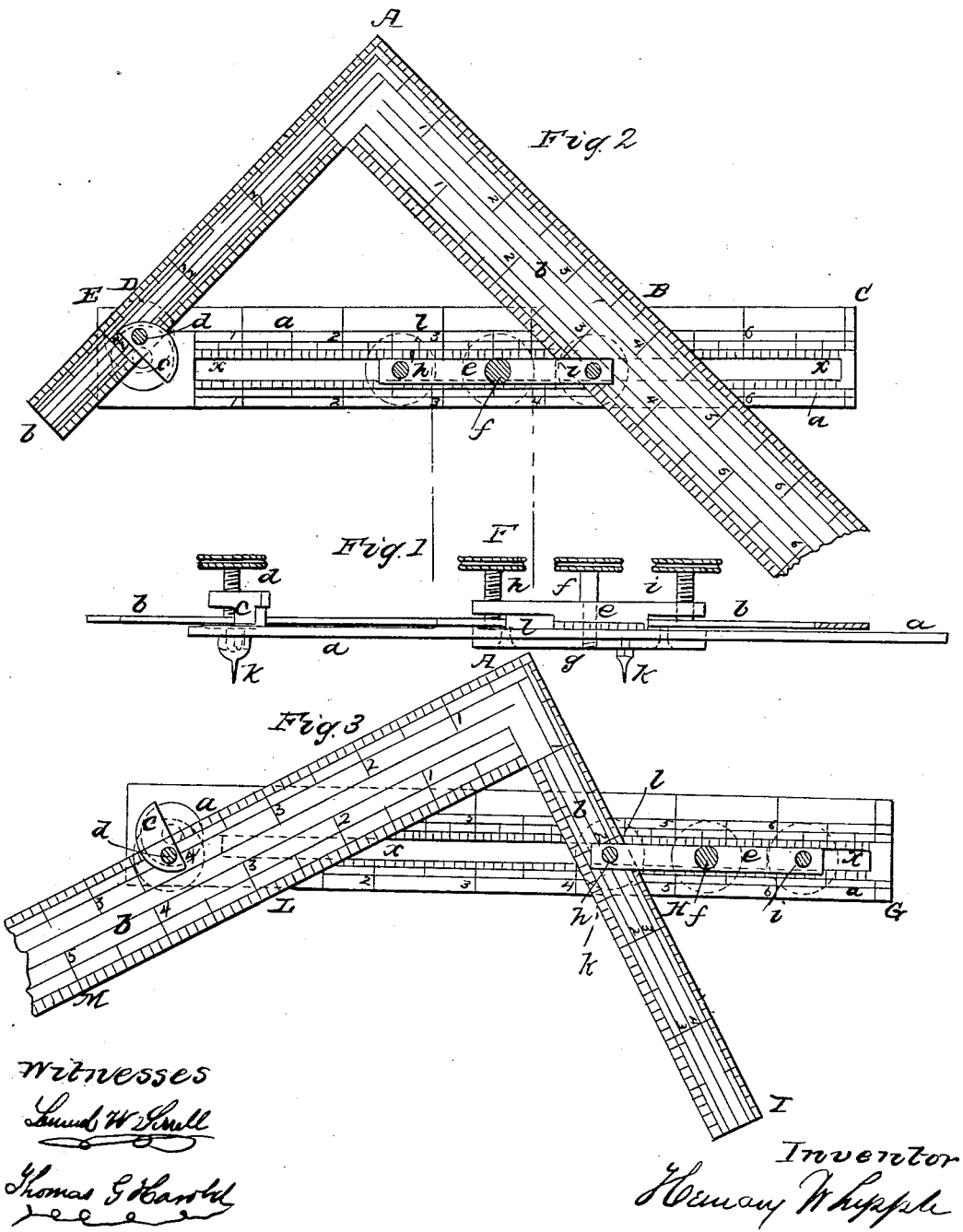

UNITED STATES PATENT OFFICE.

HEMAN WHIPPLE, OF SOUTH SHAFTSBURY, VERMONT.

INSTRUMENT FOR MEASURING THE LENGTH OF BRACES IN CARPENTRY.

Specification of Letters Patent No. 14,329, dated February 26, 1856.

*To all whom it may concern:*

Be it known that I, HEMAN WHIPPLE, of South Shaftsbury, in the county of Bennington and State of Vermont, have invented, made, and applied to use certain new and useful Improvements in Means for Denoting Angles, Bevels, the Length of Braces, &c., which I denominate the "Brace Rule and Square;" and I do hereby declare that the following is a full, clear, and exact description of the construction and operation of the same, reference being had to the annexed drawing, making part of this specification, wherein—

Figure 1, is an elevation edgewise of the square and brace rule; Fig. 2, is an elevation of the square and rule on the side thereof, as applied to use on the inner edges of the square; and Fig. 3, is a similar elevation of the brace rule as applied to the outer edges of the square.

Similar marks of reference indicate the same parts.

The nature of my said invention consists in so constructing a rule or scale that it can be applied to an ordinary square to determine the length of the hypothenuse of a right angle triangle, and also give the angles formed at the ends of the hypothenuse, thereby braces, rafters, and other timbers, can be accurately laid off; and this instrument can be applied to a variety of other uses as hereafter designated.

In the drawing the brace rule $a$, is shown as applied to an ordinary square, and the parts may be of metal or any suitable material and the divisions of feet and inches, and tenths or twelfths of inches or other fractional parts may be of any desired character, although divisions of feet inches and tenths probably will be found most convenient.

Near one end of the brace rule $a$, is a revolving clamp button $c$, constructed with a thin disk or circular head, partially let into the surface of the brace rule and secured thereto by the screw point passing through said rule and receiving a nut on its end. The circular head of this clamping button is formed with an overhanging flanch receiving the clamp screw $d$, and on reference to Figs. 2 and 3 it will be seen that the clamping button receives the edge of the square on the cross line of the center and enables the user to see the exact point at which the center of motion of said revolving button coincides with the square $b$, by said button $c$, being cut away at right angles to the square on the cross line of the center of the button. It will be thus seen that when any given length or position on either limb of the square $b$, is determined and the button $c$, clamped with its center of motion at the required point, the said brace rule $a$, can be revolved around on said button $c$, into any position and for any purpose; and the measurement of the brace rule $a$, will be accurate at the intersection of the other limb of the square $b$, because the divisions on said brace rule commence at the center of said button $c$.

Through the brace rule $a$, I make a slot $x$, one side of which is on the line of the center of the button $c$, and in this slot I use a traveling clamp $e$, held to its place when required by the screw $f$, passing into a plate $g$ on the under side of the brace rule. At the ends of this traveler $e$, clamp screws $h$, and $i$, are fitted so as to secure when necessary the square $b$, when passed into the ends of this traveler $e$. The heads of these clamp screws $d$, $f$, $h$, and $i$, are only shown by dotted lines in Figs. 2 and 3, to represent the other parts more clearly. And on each side of the clamp $e$, verniers are fitted, adapted to the divisions of the brace rule $a$, so as to determine to the hundredth or other part of an inch, the position of said clamp $e$, on the brace scale.

To determine the hypothenuse, set the button $c$, on the inside or outside of the square at the given or proportionate length of one side of the right angle triangle either the base or perpendicular thereof, turn the brace rule and slide the traveler $e$, until it coincides with the required point of the square denoting the length or proportion of the base or perpendicular as the case may be, and the brace rule gives the hypothenuse exactly. If the button $c$, be set to the outside of the square as in Fig. 3, the point of measurement is at $l$, and the traveler $e$, is beveled off from this point so as to touch the square only at this place; and if the angle be such that this cannot be done the square must be applied as in Fig. 2.

On clamping the traveler and square the top and bottom angles A, B, C, and A, D, E, of a brace can be determined and laid out.

By releasing the clamp e, Fig. 2, and sliding it back the square b, can be used as a T square as seen by dotted lines at F.

The angles for a bevel miter or brace can be determined and laid out as at G, H, I, and K, L, M. And if a given point on either limb of the square is taken as a center and angles laid out therefrom, the brace rule with the button c, clamped at said point can be used to lay off said angles.

The other uses of this instrument will be apparent; and the same might be used as a beam compass by having suitable points (k k) attached thereto.

I do not claim determining the length of the hypothenuse and the subtended angles by a square and rule as this has been done in several instruments but—

What I claim and desire to secure by Letters Patent is—

1. The button c, to receive and clamp the square on the center lines of motion of said button in the manner and for the purposes specified.

2. I also claim the traveler e, with one side on the line of the slot x, and center of the button c, for the purposes and as specified.

In witness whereof I have hereunto set my signature this twenty fourth day of October 1855.

HEMAN WHIPPLE.

Witnesses:
LEMUEL W. SERRELL,
THOMAS G. HAROLD.